United States Patent [19]

Glasgow et al.

[11] 4,318,508

[45] Mar. 9, 1982

[54] ROOM TEMPERATURE CONTROLLER

[75] Inventors: Norman B. Glasgow, Clearwater; William E. Coleman, Jr., Largo, both of Fla.

[73] Assignee: Sensatrol, Inc., Pinellas Park, Fla.

[21] Appl. No.: 102,118

[22] Filed: Dec. 10, 1979

[51] Int. Cl.³ .............................................. G05D 23/00
[52] U.S. Cl. ................... 236/47; 165/11 R; 367/133
[58] Field of Search ............... 236/1 R, 47; 165/11; 62/158; 307/117; 367/133, 136; 362/276

[56] References Cited

U.S. PATENT DOCUMENTS

| | | | |
|---|---|---|---|
| 3,934,156 | 1/1976 | Galemmo et al. | 307/117 |
| 4,045,973 | 9/1977 | Anderson et al. | 62/158 |
| 4,103,294 | 7/1978 | Stettner et al. | 367/136 |
| 4,223,831 | 9/1980 | Szarka | 236/1 R |

*Primary Examiner*—William E. Wayner
*Attorney, Agent, or Firm*—Duckworth, Allen, Dyer & Pettis

[57] ABSTRACT

The room temperature controller of the present invention is adapted for use in a room in which the temperature is controlled by a thermostat coupled to an air conditioner unit. The room temperature controller includes a detector positioned within the room for detecting from a distance the presence of an occupant within the room. A logic and control circuit is coupled to the output of the detector and to the thermostat. The logic and control circuit modifies the normal operation of the thermostat when an occupant is not detected within the room to reduce unnecessary heating and cooling expenses. This circuit also enables the thermostat to operate normally for timed intervals when an occupant is detected within the room.

20 Claims, 6 Drawing Figures

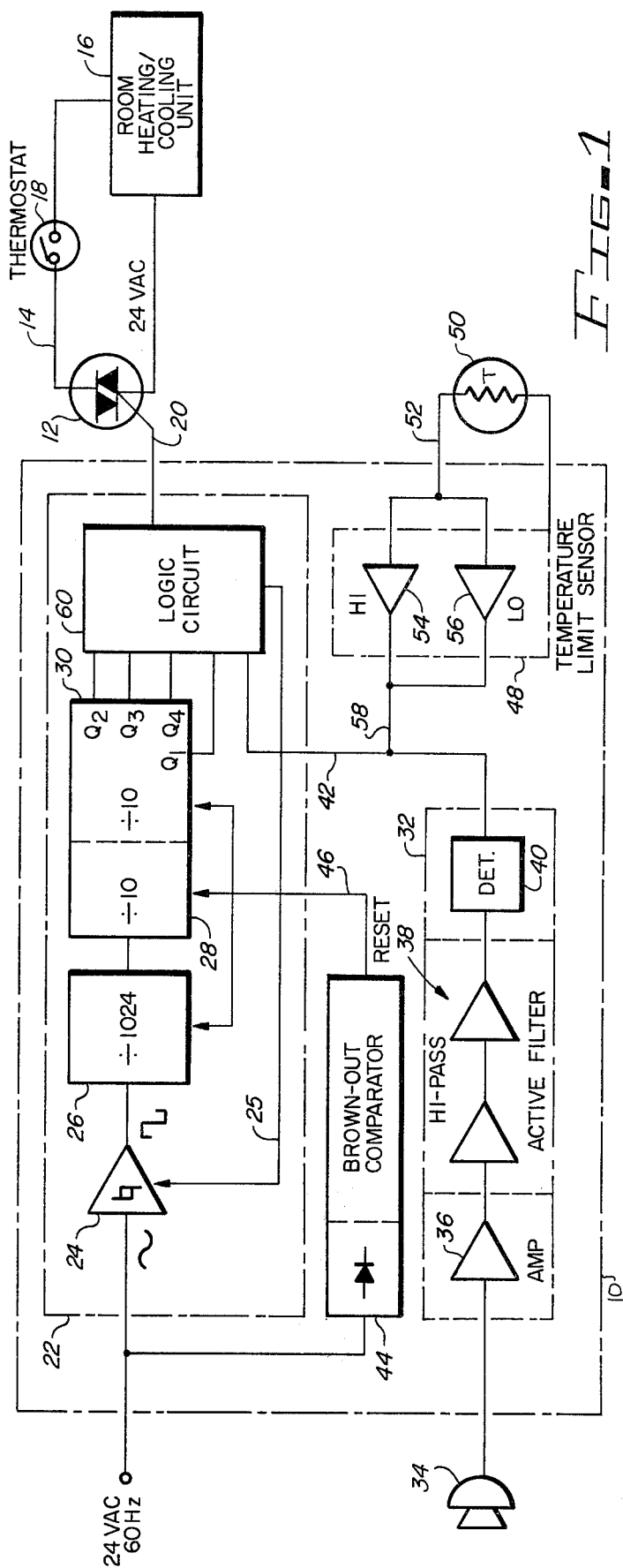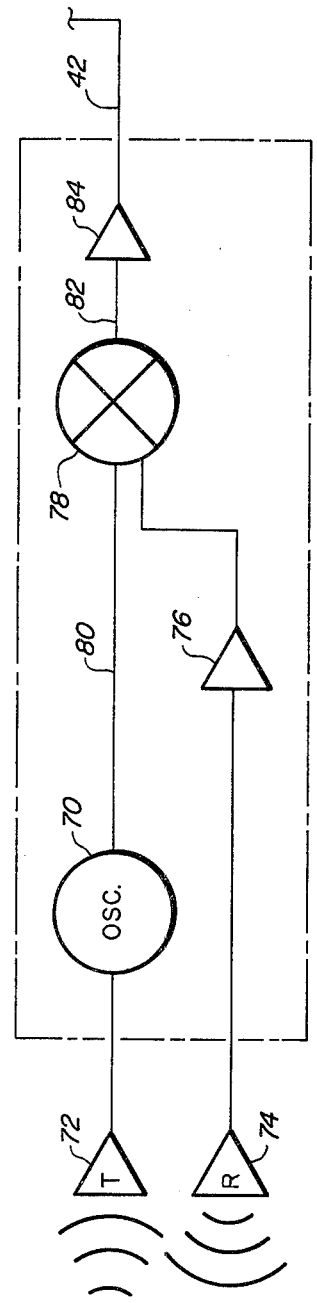

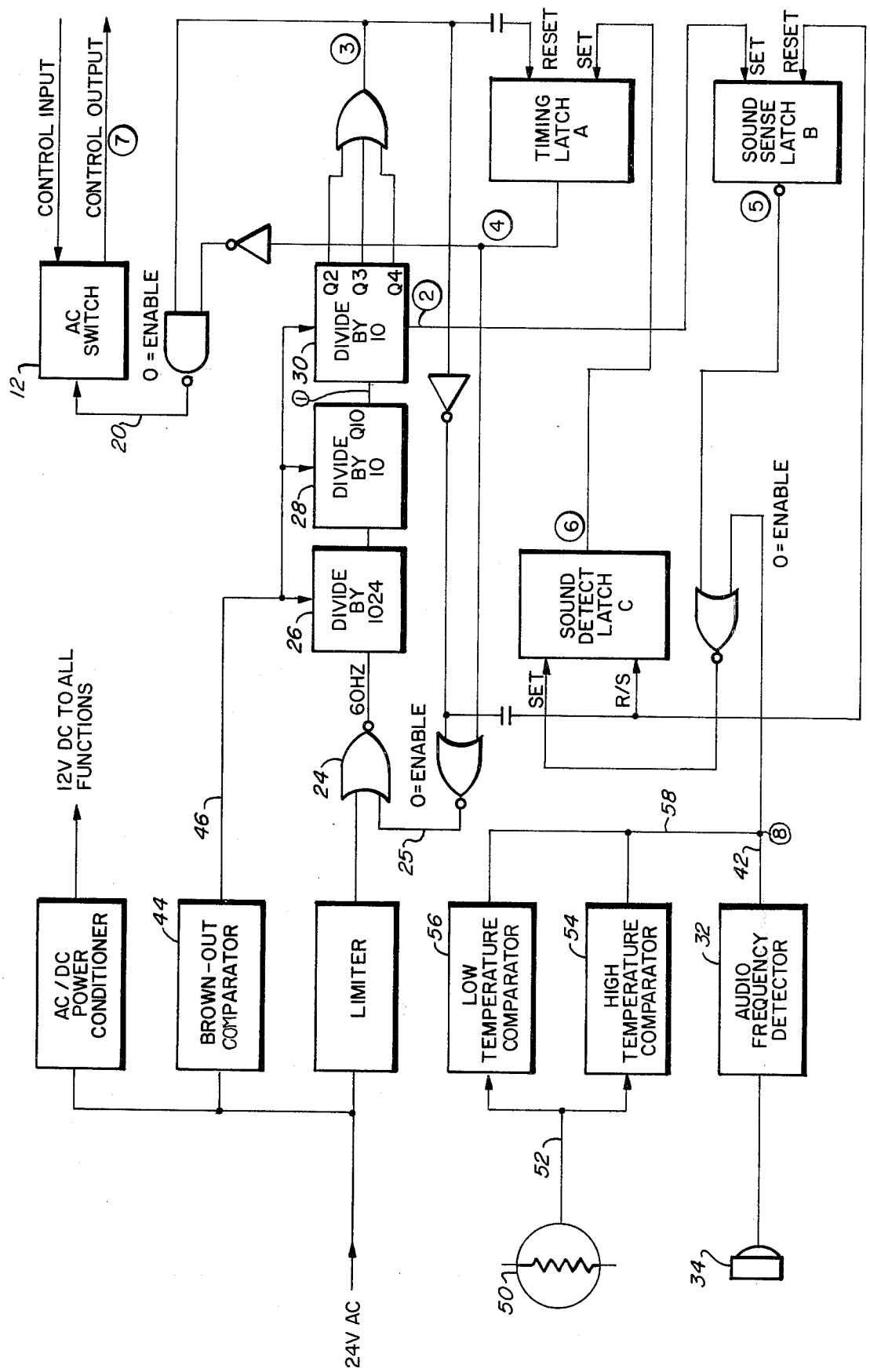

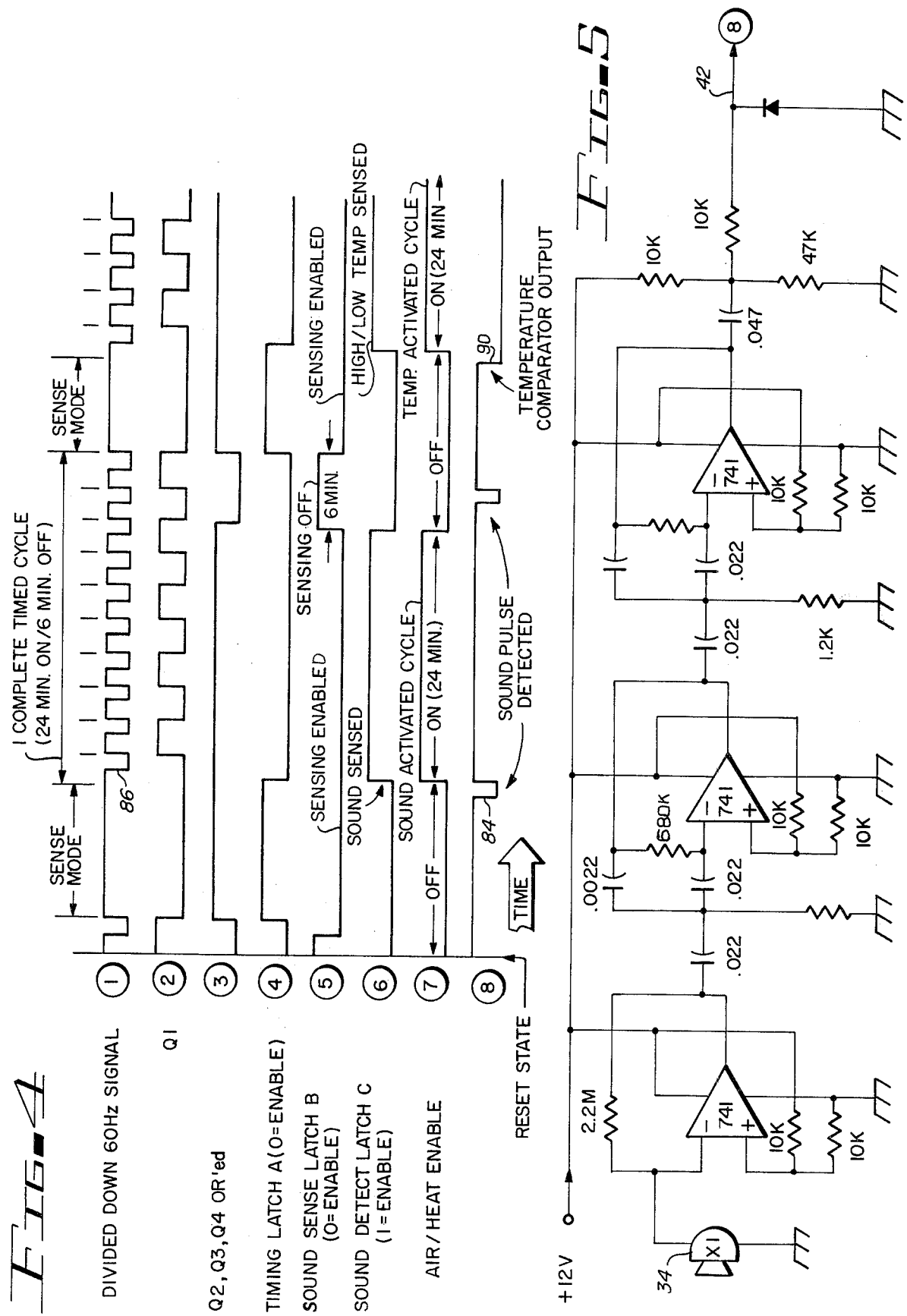

ROOM TEMPERATURE CONTROLLER

BACKGROUND OF THE INVENTION

1. Field of the Invention

The present invention relates to room temperature controllers, and more particularly, to room temperature controllers including means positioned within a room for detecting from a distance the presence of an occupant within the room.

2. Description of the Prior Art

The prior art includes a number of different types of devices for detecting the presence of a person within a predetermined area. U.S. Pat. No. 4,024,413 (Olita) discloses a sound activated switch which illuminates an electric light in response to sounds generated by keys. U.S. Pat. No. 3,573,817 (Akers) discloses a multiple-sensor monitoring system which includes an audio sensor for detecting the presences of sounds within the area being monitored.

U.S. Pat. Nos. 2,655,645 (Bagno) and 3,597,754 (Lerner) disclose ultrasonic motion detector systems designed to detect a moving object within a monitored area.

The prior art also discloses numerous types of energy control systems for room heating and cooling units which modify the ambient room temperature when an occupant is not within a particular room. U.S. Pat. No. 4,060,123 (Hoffman) discloses a key actuated device of this type which permits the thermostat of a room air conditioning unit to operate normally when a key is inserted into the device. When an occupant is not present within the room, an unoccupied room status is indicated and the room air temperature is permitted to either rise or fall to a predetermined heating and cooling limit to reduce energy consumption by the room air conditioning unit. A related invention of this type is disclosed in U.S. Pat. No. 3,934,797 (Perlmutter). The Perlmutter patent discloses a dual range thermostat. One of the temperature ranges of the thermostat corresponds to an unoccupied temperature setting while the other range corresponds to an occupied temperature setting. A clock which can be preset swithes the thermostat between the occupied and the unoccupied temperature ranges.

The prior art discloses numerous different types of thermostatic control devices which control the operation of an air conditioning unit in response to a number of different input parameters. U.S. Pat. No. 4,020,897 (Enter) discloses an automatic interior environment control system which senses the intensity of solar radiation, daily solar radiation accumulation, nocturnal temperature modification, and other parameters to control the operation of an environmental control system. U.S. Pat. No. 3,246,839 (Steghart) discloses a device for controlling a central heating system which senses numerous parameters such as wind velocity, outside temperature and solar radiation intensity. U.S. Pat. No. 4,024,725 (Uchida) discloses a control system for an air conditioner which senses parameters such as room temperature, room air flow velocity, relative humidity and radiation temperature. U.S. Pat. No. 4,040,565 (Thistiansen) discloses a control unit for thermal conditioning systems and includes outside and inside temperature measuring devices and an analog computer which determines the required amount of "on time" for the air conditioning system.

U.S. Pat. No. 3,050,601 (Bohm) discloses a temperature control system having a mechanically driven, time variable cycling thermostat. U.S. Pat. No. 3,102,689 (Ditto) discloses a temperature controller which includes both an on-off control and a time-proportioning control. U.S. Pat. No. 4,020,358 (Wylend) discloses a device for controlling the supply of power to an electrical load. This device includes a temperature sensor.

SUMMARY OF THE INVENTION

The present invention contemplates a temperature controller for a room in which the temperature is controlled by a thermostat coupled to an air conditioning unit. The temperature controller includes means positioned within the room for detecting from a distance the presence of an occupant within the room. The temperature controller also includes means coupled to the thermostat and to the detector means for modifying the operation of the thermostat when an occupant is not detected within the room.

An important aspect of the temperature controller of the present invention is its ability to automatically modify the operating temperature limits of a room air conditioning unit when the room is unoccupied and the operting time of the unit when the room is occupied without the requirement for any human control or activation.

DESCRIPTION OF THE DRAWINGS

The invention is pointed out with paticularlity in the appended claims. However, only objects and advantages together with the operation of the invention may be better understood by reference to the following detailed description taken in conjunction with the following illustrations wherein:

FIG. 1 is a block diagram representation of the sound activated version of the room temperature controller.

FIG. 2 is a block diagram of an ultrasonic occupant detector for the room temperature controller.

FIG. 3 is a more detailed electrical block diagram of the sound activated version of the room temperature controller.

FIG. 4 is a timing diagram of the room temperature controller circuit elements illustrated in FIG. 3.

FIG. 5 is a detailed electrical schematic diagram of the audio frequency detector means of the sound activated version of the room temperature controller.

DETAILED DESCRIPTION OF THE INVENTION

Figure 6:
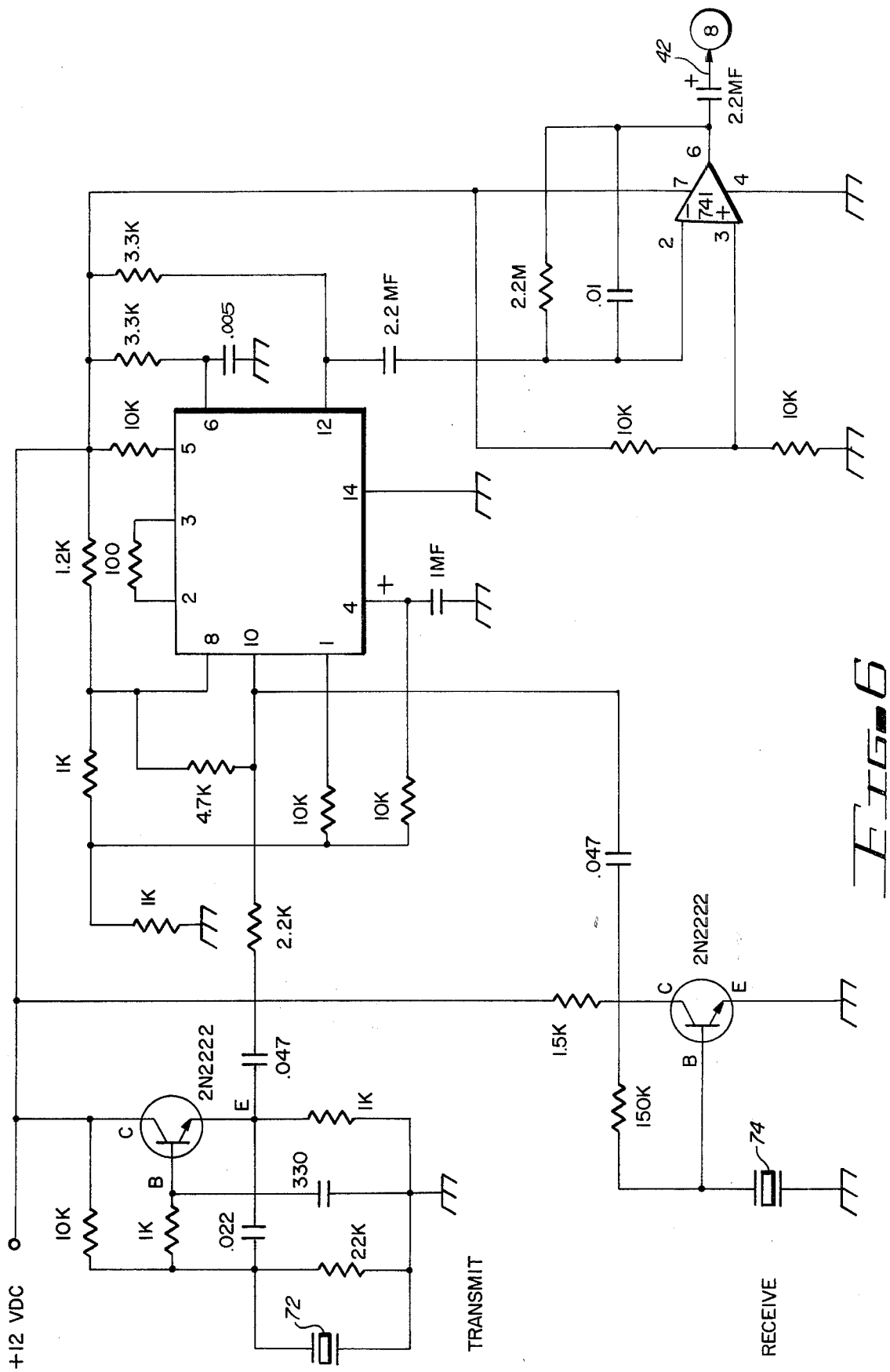
FIG. 6 is a detailed electrical schematic diagram of the ultrasonic motion detector for the room temperature controller.

In order to better illustrate the advantages of the invention and its contributions to the art, the various features of two versions of the preferred embodiment of the present invention will be reviewed in detail.

Referring now to FIG. 1, room temperature controller 10 operates a Triac 12 which is coupled in series with the 24 volt A.C. control line 14 which extends between a room heating/cooling unit and a conventional room thermostat 18. When output conductor 20 of room temperature controller 10 biases Triac 12 to the on position, room thermostat 18 is directly coupled to room heating/cooling unit 16 in a conventional manner and functions to control the operation of unit 16 in a fully conventional manner. When the biasing voltage is removed from output conductor, Triac 12 ceases to conduct and effectively disconnects thermostat 18 from air conditioning unit 16. In this latter condition, unit 16 will not operate to either heat or cool the air within the room where thermostat 18 is positioned.

Timing and control means 22 includes Schmitt trigger 24. The timing input of Schmitt trigger 24 is coupled to a source of 60 Hertz alternating current such as is available from control line 14. Schmitt trigger 24 is composed of two series-connected C-Mos gates and generates a square wave output signal having a frequency of sixty Hertz. A control line 25 selectively enables and disables Schmitt trigger 24. The square wave output signal from Schmitt trigger 24 is coupled to the input of a C-Mos binary divider 26 that divides the sixty Hertz input frequency in half ten times producing a square wave output waveform having a frequency equal to sixty divided by one thousand twenty-four. The output signal of divider 26 is coupled to the input of a first decade divider 28 and then is further divided down by second decade divider 30. Divider 28 has a period of 2.84 minutes (approximately three minutes). When power is initially applied to timing and control means 22, divider 28 completes one three minute cycle before Schmitt trigger 24 is disabled by control line 25. Room temperature controller 10 is now in the "Sense Mode".

The particular room air controller 10 illustrated in FIG. 1 incorporates detecting means in the form of an audio frequency detector 32. Audio frequency detector 32 includes a crystal microphone 34 which is positioned within the room in a manner which maximizes sound reception. The electrical output of microphone 34 is coupled to the input of a 741 operational amplifier 36 which is wired to produce an extremely high voltage gain of approximately one hundred to maximize the sensitivity of audio frequency detector 32.

The output of high gain amplifier 36 is coupled to the input of a fourth order twelve hundred Hertz high pass Chebyshev cascaded active filter 38. Active filter 38 has approximately 3 dB of ripple and an overall gain of one hundred. Two 741 operational amplifiers and discrete resistors and capacitors are coupled in a conventional manner to produce the appropriate gain and frequency response characteristics.

Experimental measurements have shown that a typical motel room wall greatly attenuates audio frequencies about twelve hundred Hertz, but offers substantially less attenuation to audio frequencies below twelve hundred Hertz. Since it is essential to the operation of the room temperature controller that sounds generated in adjacent rooms or external to the room itself not activate controller 10 and since it is desired to absolutely maximize the overall gain of the unit to detect even the lowest amplitude audio frequencies generated by a room occupant, the presence of high pass filter 38 in audio frequency detector 32 greatly inhances the effectiveness and reliability of the present invention.

A simple comparator circuit composed of a biased C-Mos gate input functions as a detector 40 and is coupled to the output of high pass filter 38. Sounds of sufficient amplitude and duration produce an output from high pass filter 38 sufficient to activate detector 40. The output of detector 40 is coupled by output conductor 42 to an input of logic circuit 60. See FIG. 5 for a detailed schematic diagram of audio frequency detector 32.

A brown out comparator 44 has an input which is coupled to a source of the twenty four volt AC made available by the room heating/cooling unit 16. This alternating current input signal is rectified within brown-out comparator 44 and is converted into a direct current output voltage. The rectified DC input signal to the 741 comparator circuit within brown-out comparator 44 is R-C filtered to prevent false triggering by normal line transients generated by the air conditioning unit. A comparator circuit using another 741 operational amplifier changes state when its input voltage drops below approximately seventy five percent of the nominal voltage level. The change of state of the comparator circuit within brown out comparator 44 generates a timing reset signal on output conductor 46 which resets dividers 26, 28 and 30 within timing and control means 22. Divider 28 then goes through a 3 minute cycle before the room temperature controller can resume the "Sense Mode".

A temperature limit sensor 48 is coupled to a thermistor 50 which is positioned within the room being monitored to convert ambient room temperature into an electrical output signal. The voltage on output conductor 52 of the thermistor 50 is coupled to the input of two 741 operational amplifiers which are coupled to operate as voltage comparator circuits. Voltage comparator 54 is designed to change state when the output voltage from thermistor 50 corresponds to the maximum desired room temperature when the air conditioning unit is in the cooling mode. Typically this temperature will be on the order of eighty degress Fahrenheit. Voltage comparator 56 is designed to change output states at a predetermined low temperature limit which corresponds to the lowest desired room temperature when the air conditioning unit is in the heating mode. The lower temperature limit is typically set in at about sixty degrees Fahrenheit. The outputs from voltage comparators 54 and 56 are coupled by output conductor 58 to an input of logic circuit 60.

Referring now to FIG. 2, the ultrasonic motion detector version of the present invention is illustrated. A single transistor ultrasonic oscillator 70 generates a forty KiloHertz output signal which is converted into an ultrasonic sound signal by piezoelectric transducer 72. This transmitted ultrasonic signal is reflected off the various wall and other interior surfaces within the room and is converted into an electrical signal by a receiver transducer 74. Reflected ultrasonic signals picked up by receiver transducer 74 are amplified by a signal transistor stage 76 and are delivered to the input of an MC1496 balanced product detector 78. A small portion of the output signal from oscillator 70 is coupled by conductor 80 to a second input of product detector 78. Within product detector 78 the transmitted and received ultrasonic signals are compared. Any frequency or phase changes between these two input signals appear at output conductor 82 of product detector 78 and are amplified by a 741 operational amplifier 84. The output of amplifier 84 is coupled by output conductor 42 to the input of logic circuit 60. See FIG. 6 for a detailed schematic diagram of the ultrasonic motion detector.

In another version the preferred embodiment, the occupant detector means of the present invention can take the form of an infrared detector which detects the presence of infrared radiation from a human body within the room. This infrared detector generates an output signal which is coupled to the input of logic circuit 60 in the manner described above.

The primary purpose accomplished by incorporating the room temperature controller of the present invention into a room air conditioning unit is that a substantial energy savings can be realized by reducing the heating- /cooling load in an unoccupied room. Upper and lower temperature limits are established to permit the room to be relatively quickly heated or cooled to a point within the comfort level so that a guest upon arriving in the room will not be uncomfortably hot or cold more than a reasonable period of time. In certain climates, permitting the temperature within an unoccupied room to increase above a predetermined level may promote the growth of mildew and be undesirable for this additional reason.

Referring now to FIGS. 3 and 4, a substantially more detailed block diagram of the room temperature controller illustrated in FIG. 1 will be discussed in some detail. FIG. 3 includes essentially the same circuit elements as the block diagram illustrated in FIG. 1, except that the specific logic circuit elements of logic circuit 60 have been shown in more explicit detail. Circled reference numbers have been placed at various position in FIG. 3 and relate the input and output waveforms of the circuit elements of FIG. 3 to the timing diagram illustrated in FIG. 4. Reference number 1 indicates the output waveform of divider 28. Whenever brown out comparator 44 generates a counter reset signal or when the unit is initially powered up, divider 28 cycles through a single three minute cycle before the room temperature controller circuit transitions into the sense mode. At this time logic circuit 60 generates an output signal on control line 25 which disables trigger 24, terminating the timing function of timing and control means 22.

Timing and control means 22 will remain in the sense mode for an indeterminate period of time until a sound pulse is detected by audio frequency detector 32. Reference number 84 indicates the time at which a sound pulse is detected by audio frequency detector 32 and an output pulse is transmitted over output conductor 42 to logic circuit 60. The presence of this electrical pulse on output conductor 42 actuates the logic circuitry illustrated in FIG. 3 in a manner well known to those skilled in the art. Schmitt trigger 24 is enabled by this output pulse and divider 28 commences operation. One half cycle later, divider 28 generates the negative edge indicated by reference number 86 which enables sound detect latch C (timing reference number 6), activating AC switch 12 into the "on" condition as indicated by timing reference number 7. This sound activated cycle continues for 22.755 minutes (approximately 24 minutes). At the end of this twenty-four minute "on" cycle, sense latch B transitions to a high output level for two complete cycles of divider 28. This approximate six minute timing interval disables the sensing circuit and causes AC switch 12 to disable thermostat 18 of room heating/cooling unit 16 for this six minute period. Reference number 88 indicates a sound-generated output pulse from audio frequency detector 32. Since this electrical pulse occurs at a time when sound sense latch B is in a high state (sensing circuit "off"), it has no effect on the operation of the logic circuitry of the room temperature controller.

At the end of the six minute interval in which sound sense latch B is in a high logic level state, this latch will automatically be transitioned to the "enable" (sensing circuit "on") or low level state for an indeterminate period of time. The room temperature controller will remain in the "sense mode" for an indeterminate period of time until another sound pulse is generated or until a low or high temperaure condition is sensed by comparators 54 and 56. Reference number 90 indicates the point at which an output from comparator 54 or 56 is detected. This output is indicated as lasting a number of minutes since it is assumed that the temperature override condition will not be immediately remedied by transitioning the room temperature controller into the "on" condition. At the end of a 24 minute "on" cycle, the room temperature controller will cycle the room heating/cooling unit to the "off" condition for six minutes. If the high or low temperature output signal is detected again at the end of this six minute "off" cycle, the room temperature controller will energize the room heating/cooling unit for another twenty-four minute cycle.

This system will occassionally be unnecessarily activated by telephone calls to an empty room in which the sound activated version of the room air temperature controller is installed. Inadvertent system activations of this type will have a negligible affect on the system since one telephone call can activate the system for only a single twenty-four minute cooling or heating cycle. When a guest goes to bed at night and ceases to move about in the bed, the system will cease detecting the presence of the occupant within the room. The temperature within the room will then either increase or decrease toward the unoccupied temperature limit. Typically, the room occupant will remain comfortable while asleep when the high or low temperature limits have been reached. If the room occupant becomes uncomfortable, he will generally resume physical activity which will be detected by the detector means of the present invention causing the system to resume normal occupied status heating or cooling temperature control.

It will be apparent to those skilled in the art that the disclosed room temperature controller may be modified in numerous ways and may assume many embodiments other than the preferred forms specifically set out and described above. Accordingly, it is intended by the appended claims to cover all such modifications of the invention which fall within the true spirit and scope of the invention.

We claim:

1. A control device for a room in which the temperature is controlled by an adjustable thermostat which controls heating and cooling apparatus comprising:
   detection means disposed in the room for producing a control signal when the room is occupied;
   control means connected to said detection means for enabling said thermostat in response to said control signal; and
   timing means connected to said control means for causing said control means to disable said thermostat after a first preselected time period following an occurrence of said control signal and to disable said detection means for a second preselected time period following said first preselected time period, said second period short with respect to said first period.

2. The device as defined in claim 1 in which said detection means is a sound sensing means for producing said control signal in response to sounds created by occupants of the room.

3. The device as defined in claim 1 in which said detection means is an ultrasonic motion detector for producing said control signal in response to motion of occupants of the room.

4. A control device for a room in which the temperature is controlled by an adjustable thermostat, said thermostat adjustable by occupants of the room, in which the thermostat when operating controls heating or cooling apparatus in the room comprising:

sound sensing means disposed in the room for producing a control signal in response to high frequency sounds created by occupants of the room, said sound sensing means non-responsive to low frequencies created either externally or internally to the room;

control means connected to said sound sensing means and said thermostat, said control means responsive to said control signal to enable said thermostat such that the temperature of the room is controlled in accordance with the setting of said thermostat; and timing means connected to said control means and to said sound sensing means for disabling said thermostat for a preselected period of time following each of said control signals during which period said thermostat is prevented from controlling the temperature of the room, said timing means disabling said sound sensing means for a short time following said preselected period.

5. The device as defined in claim 4 in which said control means includes a high temperature limit sensor for sensing the room temperature and energizing said cooling apparatus when the room temperature exceeds a preset high temperature limit.

6. The device as defined in claim 4 in which said control means includes a low temperature limit sensor for sensing the room temperature and energizing the cooling apparatus when the room temperature is less than a preset low temperature limit.

7. The device as defined in claim 5 or 6 in which said temperature limit sensor includes an thermistor.

8. The device as defined in claim 4 in which said sound sensing means includes a high pass filter having a sharp cutoff for frequencies below a preselected frequency, such frequency selected to be higher than a frequency for which sounds generated external to the room are highly attenuated by the room walls.

9. The device as defined in claim 8 in which said filter is a high pass active filter.

10. The device as defined in claim 9 in which said filter is a multi-order Chebyshev filter having a cutoff frequency of about 1200 Hz.

11. The device as defined in claim 1 or 4 in which said timing means includes a divider for receiving an alternating current waveform from a power line, said divider counting down from the frequency of said power line to define said time periods.

12. The device as defined in claim 4 in which said control means comprises:

a logic circuit for receiving inputs from said timing means, said sound sensing means, and said high and low temperature limit sensors for selecting a desired operation mode; and electronic switch means controlled by said logic circuit for enabling and disabling said thermostat.

13. The device as defined in claim 12 in which said electronic switch is a triac.

14. The device as defined in claim 1 or 4 which further comprises:

a reference voltage source less than the voltage of the power line supplying said heating and cooling apparatus;

comparator means for producing a disable signal when the power line voltage drops below said reference voltage; and said control means is connected to said comparator for disabling said thermostat in response to the disable signal from said comparator.

15. The device as defined in claim 14 in which the voltage of said reference source is about 25% below the normal line voltage.

16. The device as claimed in claim 4 in which said sound sensing means includes:

sound transducer for converting sound within the room into an electrical output signal; and amplifier means connected to the output of said transducer for amplifying the electrical output signal from said transducer.

17. The device as defined in claim 4 in which said sound sensing means comprises:

sound transducer for producing electrical signals responsive to sounds originating within the room; and amplifying means having very high gain to frequencies above about 1200 Hz and very low gain to signals significantly lower than 1200 Hz.

18. In a room having a heating and cooling unit controlled by an adjustable thermostat, apparatus for disabling the thermostat when the room is not occupied and enabling the thermostat when the room is occupied comprising:

an audio transducer for producing electrical signals from sounds produced in the room;

amplifier means connected to said transducer for amplifying said electrical signals therefrom;

high pass filter means having a sharp cutoff frequency, said frequency selected in accordance with a frequency for which the walls of said room greatly attenuate sounds generated external to the room;

detector means connected to said high pass filter for producing a logic signal when electrical signals are present at the output of said filter;

logic circuit means connected to said detector means for receiving said logic signal;

counter means connected to an ac power line for counting down from the power line frequency to produce a first preselected period of time and to produce a second shorter preselected time period immediately thereafter, said counter having outputs connected to said logic circuit;

a thermistor disposed in said room for measuring the ambient temperature thereof;

high temperature comparator connected to said thermistor for producing a logic signal when the ambient temperature exceeds a preset high temperature;

low temperature comparator connected to said thermistor for producing a logic signal when said ambient temperature is less than a preselected low temperature, the outputs of said high temperature and low temperature comparators connected to said logic circuit;

electronic switch means connected to said thermostat for enabling said thermostat when said switch means is closed and disabling said thermostat when said switch means is open, said switch means connected to said logic circuit means and responsive to control signals therefrom, said logic circuit means closing said switch means responsive to a logic signal from said detector means, a logic signal from said high temperature comparator or a logic signal from said low temperature comparator, said logic circuit means opening said switch means responsive to said outputs from said counter means after expiration of said preselected time period and disregarding a logic signal from said detector means during said shorter preselected time period.

19. The apparatus as defined in claim 18 which further comprises a brown-out comparator for disabling the thermostat when the operating voltage of the heating and cooling unit is more than twenty five percent below the normal operating voltage.

20. In a room having a heating and cooling unit controlled by an adjustable thermostat, apparatus for disabling the thermostat when the room is not occupied and enabling the thermostat when the room is occupied comprising:

means for transmitting an ultrasonic signal within the room;

means for receiving ultrasonic signals from said transmitting means wherein said received signals are reflected from various surfaces in the room;

means coupled to said transmitting means and said receiving means for detecting changes in frequency or phase between said transmitted signal and said received signal, said detecting means producing a logic signal when a frequency or phase change is detected;

logic circuit means connected to said detecting means for receiving said logic signal;

counter means connected to an ac power line for counting down from the power line frequency to produce a first preselected period of time and to produce a second shorter preselected time period immediately thereafter, said counter having outputs connected to said logic circuit;

a thermistor disposed in said room for measuring the ambient temperature thereof;

high temperature comparator connected to said thermistor for producing a logic signal when the ambient temperature exceeds a preset high temperature;

low temperature comparator connected to said thermistor for producing a logic signal when said ambient temperature is less than a preselected low temperature, the outputs of said high temperaure and low temperature comparators connected to said logic circuit;

electronic switch means connected to said thermostat for enabling said thermostat when said switch means is closed and disabling said thermostat when said switch means is open, said switch means connected to said logic circuit means and responsive to control signals therefrom, said logic circuit means closing said switch means responsive to a logic signal from said detector means, a logic signal from said high temperature comparator or a logic signal from said low temperature comparator, said logic circuit means opening said switch means responsive to said outputs from said counter means after expiration of said preselected time period and disregarding a logic signal from said detector means during said shorter preselected time period.

* * * * *